June 10, 1958    M. E. REINECKE    2,837,961
DRIVE MECHANISM
Filed June 27, 1955    2 Sheets-Sheet 2

INVENTOR.
M. E. REINECKE
BY Hudson & Young
ATTORNEYS

United States Patent Office 2,837,961
Patented June 10, 1958

2,837,961

DRIVE MECHANISM

Marvin E. Reinecke, Bartlesville, Okla., assignor to Phillips Petroleum Company, a corporation of Delaware Application June 27, 1955, Serial No. 518,271

3 Claims. (Cl. 88—14)

This invention relates to apparatus to transmit motion from a driving means to a driven means. In another aspect it relates to balancing and telemetering apparatus for use with analytical instruments.

In various types of analytical instruments there is a need to transmit motion from a servomotor to balancing and telemetering apparatus. For example, differential refractometers have recently been developed wherein a beam of radiation is deflected automatically in response to changes in refractive index of a test material so as to remain focused on a predetermined portion of a detecting means. This is accomplished by rotating a mirror or deflector in response to an electrical output signal from the detecting means. The electrical signal actuates a servomotor which rotates the radiation deflector. In apparatus of this type there normally is a relatively small transfer of energy from the servomotor to the balancing means. The servomotor is commonly mounted in the instrument separately from the balancing mechanism, and for this reason it is desirable that the connecting means be flexible. The balancing mechanism must rapidly follow any deviation of the light beam so that lost motion in the driving mechanism cannot be tolerated. Furthermore, it is desirable to provide stop members in the balancing mechanism to prevent the apparatus from being rotated excessively in either direction. This requires a slip type flexible connection to the servomotor.

In accordance with the present invention there is provided improved driving mechanism which is particularly adapted for use with an analytical instrument and which meets the above requirements. The drive shaft and the driven shaft are mounted in spaced relation with one another along substantially a common axis. A flexible metal bellows is connected at one end to the driving shaft. A clutch plate is mounted on the driven shaft. The second end of the bellows carries a clutch facing disk which engages the clutch plate to provide a connection between the two shafts. The bellows thus transmits motion between the two shafts and is sufficiently flexible to compensate for errors in alignment of the shafts. In the event that rotation of the driven shaft is terminated, the clutch facing disk is free to slip on the clutch plate to prevent further rotation.

Accordingly, it is an object of this invention to provide improved driving means which is capable of accommodating variations in alignment of the driving and driven means.

Another object is to provide an improved form of slip clutch driving means.

Other objects, advantages and features of the invention should become apparent from the following detailed description taken in conjunction with the accompanying drawing in which.

Figure 1:
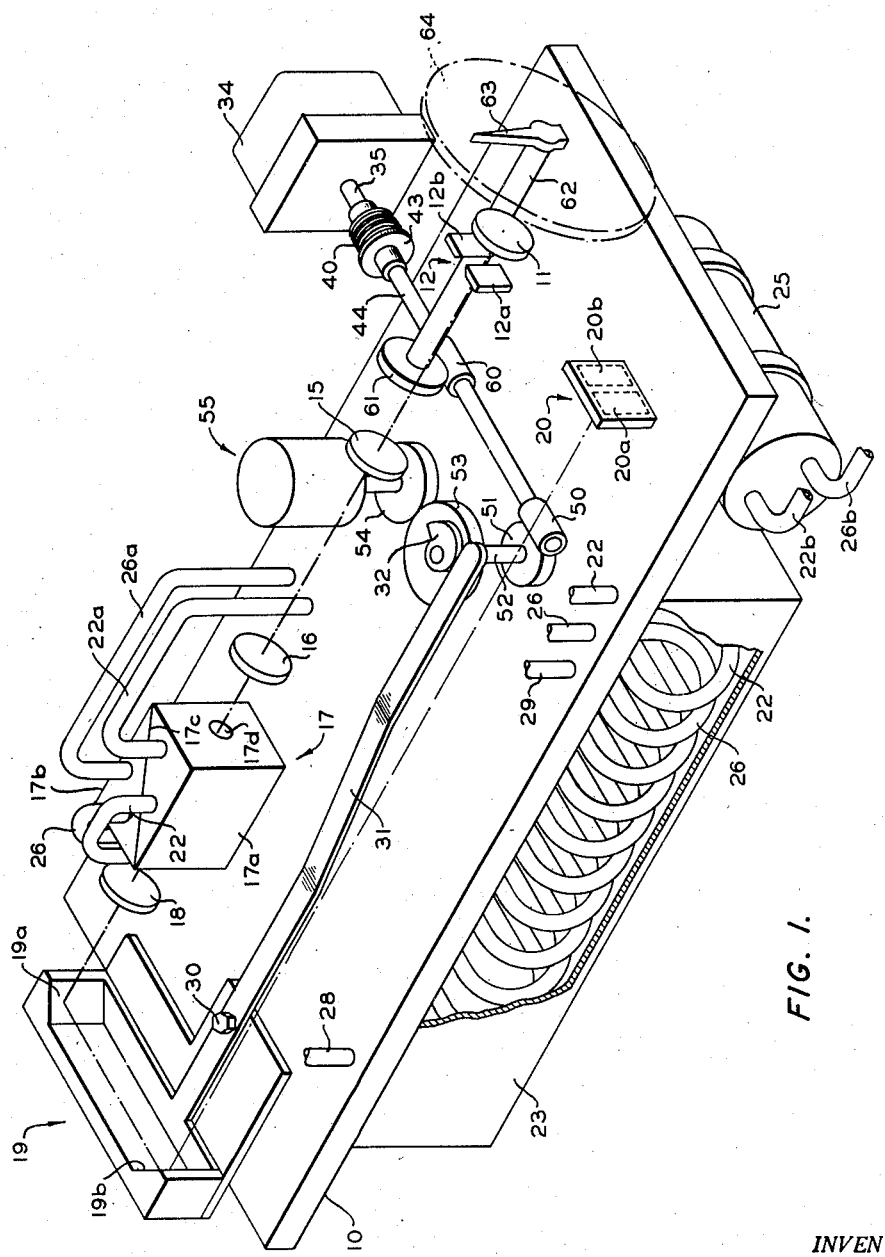
Figure 1 is a schematic representation of a differential refractometer having the drive mechanism of the present invention incorporated therein.

The present invention is particularly suited for use with a differential refractometer and will be so described herein for purposes of illustration. With reference to Figure 1 of the drawing, there is shown a base plate 10 upon which is mounted a source of radiation 11. Light from source 11 is directed through a slit 12 formed by space plates 12a and 12b, a lens 15 and a lens 16 to a refractometer cell assembly 17. The light beam transmitted through cell assembly 17 is deviated by an amount proportional to the refractive index of a test fluid circulated through the assembly. The light beam emerging from assembly 17 passes through a lens 18 and is reflected by a rotatable mirror assembly 19 to a detector unit 20. Mirror assembly 19 is rotated automatically about an axis 30 in response to an output signal from detector 20 so that the light beam remains focused upon a predetermined portion of detector 20. The amount of rotation of mirror assembly 19 needed to retain this balanced condition is a measure of the deviation of the refractive index of the sample fluid from a preselected value.

Light source 11 can provide radiation in the visible spectrum. Convex lens 15 is positioned adjacent slit 12 at a distance from source 11 so that the focal point of lens 15 is located between slit 12 and source 11. Lens 16 serves to collimate the light beam so that parallel rays are transmitted through refractometer cell assembly 17. Cell assembly 17 comprises a pair of complementary metal blocks 17a and 17b which are separated by a diagonal transverse plate 17c of radiation transparent material. A light passage 17d is formed through the two blocks. Lenses 16 and 18 can form the windows across the ends of respective blocks 17a and 17b, or separate transparent windows can be provided. A fluid stream to be measured is introduced into the instrument by a conduit 22 which extends through a container 23 mounted beneath plate 10. Conduit 22 communicates at its outlet end with passage 17d in block 17a. An outlet conduit 22a extends between passage 17d in block 17a and the inlet of a pressure equalizer 25. The sample stream is vented from pressure equalizer 25 through a conduit 22b. A reference fluid is disposed in passage 17d in block 17b. This reference fluid can be stationary in block 17b or can be circulated therethrough by means of passages 26 and 26a which correspond to the passages 22 and 22a that circulate the sample fluid. Passage 26a communicates with pressure equalizer 25. A vent conduit 26b is secured to pressure equalizer 25 to remove the standard fluid therefrom.

Container 23 is provided with an inlet opening 28 and an outlet opening 29 so that a heat transfer material, such as water, can be positioned within the container or circulated therethrough. The purpose of container 23 and the elongated conduits 22 and 26 is to equalize the temperatures of the two fluids circulated through the light passages in blocks 17a and 17b. Pressure equalizer 25 can be of the form illustrated in detail in the copending application of B. J. Simmons, Serial No. 264,515, filed January 2, 1952. This pressure equalizer comprises adjacent chambers which are separated by a flexible diaphragm. Any difference in pressure between the two fluids flexes the diaphragm until the difference is zero.

Lens 18 focuses the light beam emerging from block 17b on detector 20. This light beam is reflected by mirrors 19a and 19b of mirror assembly 19. The assembly is pivoted for rotation about a point 30. An arm 31 extends from the mirror assembly so as to be displaced near its end by a rotatable cam 32. Rotation of the mirror assembly about pivot 30 thus moves the light beam across detector 20. The detector preferably comprises adjacent photovoltaic cells 20a and 20b. The instrument normally is operated so that the light beam remains focused between cells 20a and 20b. The output voltages generated by the two cells are thus zero or equal.

Figure 2:
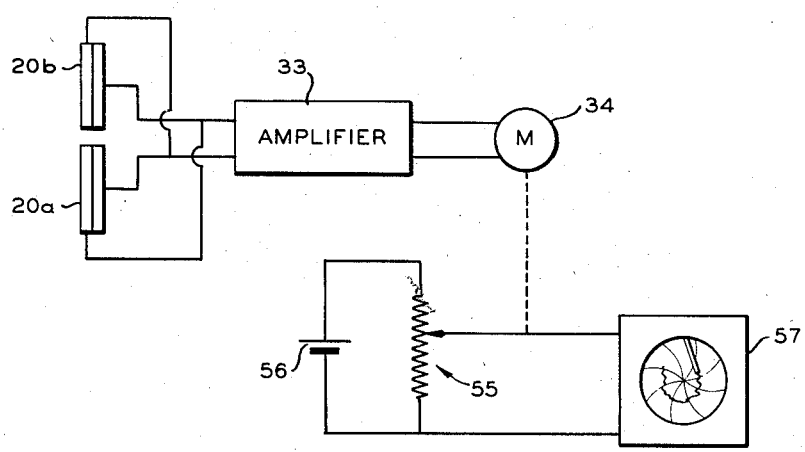
Figure 2 is a schematic circuit diagram of the electrical components of the refractometer of Figure 1.

As illustrated in Figure 2, photocells 20a and 20b are connected in electrical opposition with one another to the input terminals of a servo amplifier 33. The output signal of amplifier 33 is applied to the input terminals of a reversible motor 34. As long as equal amounts of radiation impinge upon cells 20a and 20b the net output signal therefrom is zero so that motor 34 remains stationary. If one of the photocells receives a greater amount of radiation than the other an output signal of a particular polarity is developed which drives motor 34 in one direction or the other depending upon which of the photocells receives the greater amount of light. Of course, the detecting circuit can be arranged so that motor 34 remains stationary when any other desired ratio of radiation impinges upon detectors 20a and 20b.

Figure 3:
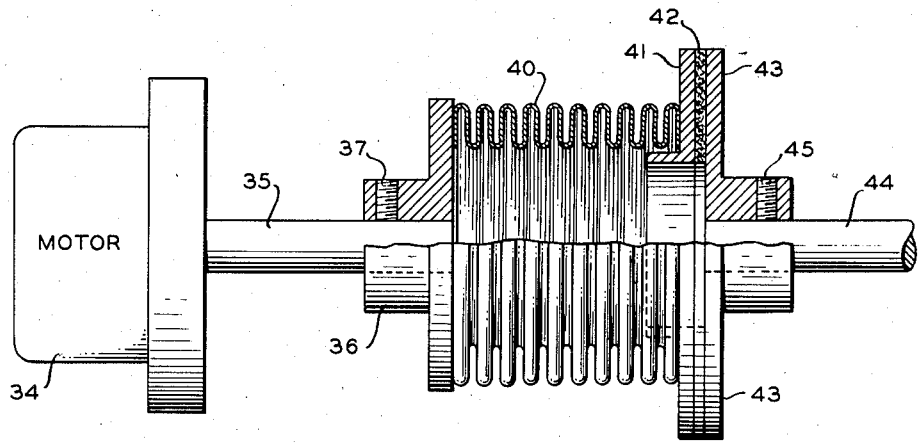
Figure 3 is a detailed view of the drive mechanism.

As illustrated in Figure 3, the drive shaft 35 of motor 34 has a hub member 36 mounted thereon by a set screw 37. A flexible metal bellows 40 is fastened at one end to hub member 36, as by soldering. The second end of bellows 40 is similarly secured to a bellows plate 41. An annular clutch facing disk 42 is secured to bellows plate 41. This disk preferably is constructed of rubber impregnated cork. Clutch facing disk 42 engages a metal clutch plate 43 which is mounted on a driven shaft 44 by a set screw 45. The compression force exerted by bellows 40 tends to retain clutch facing disk 42 in engagement with plate 43 so that rotation of bellows 40 in response to rotation of motor 34 transmits the motion to clutch plate 43 and shaft 44. Obviously, the elements of the drive mechanism can be reversed if desired.

Referring again to Figure 1, shaft 44 has a worm 50 mounted on the end thereof. The gears of Figure 1 are illustrated schematically to simplify the drawing. Worm 50 meshes with a worm gear 51 which rotates a shaft 52 which carries cam 32. In this manner rotation of motor 34 rotates cam 32 so that mirror assembly 19 is pivoted about point 30 in one direction or the other as determined by the direction of rotation of motor 34. The apparatus is arranged so that mirror assembly 19 is rotated in the proper direction to return the radiation beam to the dividing line between photocells 20a and 20b.

A gear 53 mounted on shaft 52 meshes with a gear 54 which moves the contactor of a potentiometer 55. This is illustrated schematically in Figure 2. A voltage source 56 is applied across the end terminals of potentiometer 55. The contactor and one end terminal of potentiometer 55 are connected to the input terminals of a voltage recorder 57. A second worm 60 on shaft 44 meshes with a worm gear 61 which rotates a shaft 62 to position a pointer 63 on a scale 64. This provides a visual indication of the rotation of shaft 44 which is required to balance the instrument.

If the refractive index of the test fluid should deviate from an initial value by an amount so that the contactor of potentiometer 55 is moved to one end or the other of the slide wire further movement of shaft 44 is prevented by the integral potentiometer stops. Clutch facing disk 42 then slips on clutch plate 43. The flexible bellows arrangement allows this slippage so that no damage is done either to the motor or to the balancing mechanism. Flexible bellows 40 compensates for any error in the alignment of shafts 35 and 44. This allows the motor 35 to be attached readily to the balance mechanism. This is desirable because motor 34 normally is separated from the remainder of the instrument by a wall of insulating material, not shown, which prevents heat from amplifier 33 and motor 34 from affecting the accuracy of the measurements.

From the foregoing description of a preferred embodiment of the driving mechanism of this invention it should be apparent that there is provided an improved system to transmit motion from a driving means to a driven means. This system provides a slip clutch which is sufficiently flexible to compensate for deviations in shaft alignment. Obviously the clutch plate can be attached to the driving shaft and the bellows to the driven shaft without departing from the scope of this invention. While the invention has been described in conjunction with a present preferred embodiment it should be evident that it is not limited thereto.

What is claimed is:

1. A refractometer comprising means to form a beam of radiation; means positioned in said beam to deviate said beam in accordance with the refractive index of a test material, radiation detecting means, radiation deflecting means positioned in said beam to direct said beam on a predetermined portion of said detecting means, a drive member, a driven member positioned opposite said drive member, a bellows secured at one end to one of said members and extending therefrom toward the other of said members, the second end of said bellows terminating in a first plate, a clutch plate secured to the other of said members, a clutch facing disk secured to one of said plates and extending therefrom so as to engage the other of said plates, means responsive to said detecting means to rotate said drive member when said beam does not impinge upon said predetermined portion of said detecting means, means connecting said driven member to said deflecting means to cause rotation thereof, and means connected to said driven member to indicate the position thereof.

2. A refractometer comprising means to form a beam of radiation, means positioned in said beam to deviate said beam in accordance with the refractive index of a test material, radiation detecting means, radiation deflecting means positioned in said beam to direct said beam on a predetermined portion of said detecting means, a motor, means responsive to said detecting means to rotate said motor in a direction representative of the direction of deviation of said radiation beam from said predetermined portion of said detecting means, a bellows secured at one end to the drive shaft of said motor, a second shaft to be driven positioned in substantial axial alignment with said drive shaft and spaced therefrom, a clutch plate secured to said second shaft, a clutch facing disk secured to the second end of said bellows to engage said clutch plate, and means connecting said second shaft to said radiation deflecting means to rotate said radiation deflecting means.

3. An analyzer comprising a source of radiation, radiation detecting means, means to direct a beam of radiation from said source toward said detecting means, means to vary the radiation impinging upon said detecting means in accordance with a property of a material to be detected, a drive member, a driven member positioned opposite said drive member, a bellows secured at one end to one of said members and extending therefrom toward the other of said members, the second end of said bellows terminating in a first plate, a clutch plate secured to the other of said members, a clutch facing disk secured to one of said plates and extending therefrom so as to engage the other of said plates, means responsive to said detecting means to rotate said drive member, and means responsive to rotation of said driven member to adjust the output of said detecting means until rotation of said drive member is terminated, the amount of adjustment required to terminate rotation of said drive member being representative of the property of the material to be detected.

References Cited in the file of this patent

UNITED STATES PATENTS

| 1,233,518 | Snyder | July 17, 1917 |
| 1,655,332 | Pedersen et al. | Jan. 3, 1928 |
| 1,752,106 | Persons | May 25, 1930 |
| 2,649,014 | Johnsen | Aug. 18, 1953 |

FOREIGN PATENTS

| 67,945 | Switzerland | Feb. 20, 1914 |